Figures 1, 2, 3:
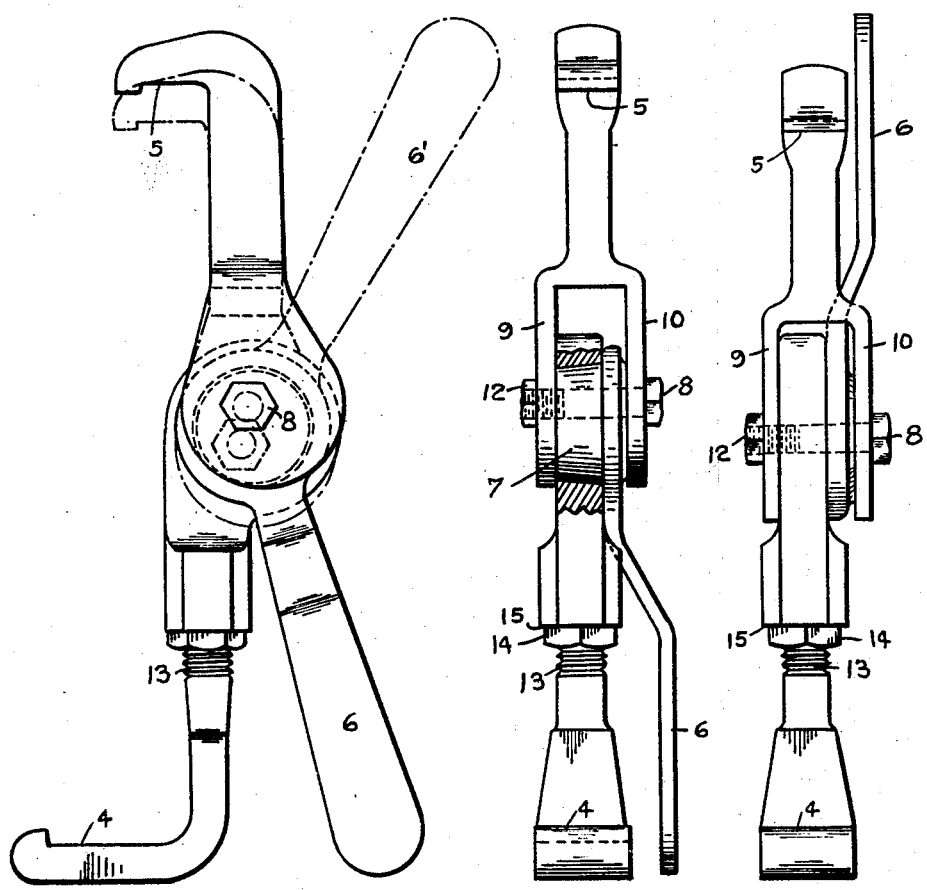

June 7, 1932.  H. A. KLATT  1,862,149

CLAMP

Filed Nov. 15, 1929

Herman A. Klatt, Inventor
By his Attorney
Thomas O'Niel.

Patented June 7, 1932

1,862,149

UNITED STATES PATENT OFFICE

HERMAN A. KLATT, OF BROOKLYN, NEW YORK, ASSIGNOR TO ESSEX FOUNDRY, OF NEWARK, NEW JERSEY, A CORPORATION OF NEW JERSEY

CLAMP

Application filed November 15, 1929. Serial No. 407,359.

My invention relates to improvements in clamps and more particularly has reference to and is shown in the accompanying drawing in its application to a hand clasp especially adapted for use in clamping the sections of a flask such as is used in iron molding.

In the accompanying drawing, I have illustrated in Fig. 1 in side elevation, a suitable form of clamp embodying an application of my invention, the same being as shown in opened position in full outline, and in locked position in dotted outline. Fig. 2 is a view looking from left to right at Fig. 1, with the clamp in opened position. Fig. 3 is a similar view, showing the clamp in closed position.

4 indicates one of the jaws which may be used at the top or bottom as may be found convenient, and 5, the other jaw, said jaws adapted to approach when the handle 6 is operated for closing the same. This handle is provided with an inwardly projecting circular portion 7, mounted eccentrically with reference to the bolt 8, which bolt passes through the bifurcated end 9, 10 of the jaw 5, and through the handle 6, and moves the jaws together or apart when said handle 6 is turned, 12 indicating a nut for securing the combination in position.

The shank of the jaw 4, is also preferably threaded as indicated at 13, and is provided with a nut 14, to jam against the shoulder 15 of said jaw 4, so as to permit of filling the gap between the ends of the jaws 4 and 5, for flasks of different sizes.

Of course it will be understood that various modifications may be made in the construction and arrangement of parts without departing from the spirit of the invention as claimed.

I claim:

1. In a clamp of the class described, a pair of jaws one of which has a bifurcated bearing at the inner end, and the other of which has a ring bearing adapted to turn within said bifurcated bearing at the inner end, a handle having a laterally projecting cam member adapted to engage said ring bearing, and a pin through said bearings and cam member whereby when said handle is operated said jaws are adjusted.

2. In a clamp of the class described, a pair of jaws one of which has a bifurcated bearing at the inner end, and the other of which has a ring bearing adapted to turn within said bifurcated bearing at the inner end, a handle having a laterally projecting cam member adapted to engage said ring bearing, and a pin through said bearings and cam member whereby when said handle is operated said jaws are adjusted, one of said jaws having a threaded telescopical inner end for independent adjustment thereof.

In testimony whereof I hereunto affix my signature.

HERMAN A. KLATT.